Patented Dec. 7, 1937

2,101,822

UNITED STATES PATENT OFFICE 2,101,822

MANUFACTURE OF UNSATURATED ORGANIC AMIDES

John William Croom Crawford and James Grigor, Norton-on-Tees, England, assignors to Imperial Chemical Industries Limited, a corporation of Great Britain No Drawing. Application May 7, 1936, Serial No. 78,488. In Great Britain May 10, 1935

13 Claims. (Cl. 260—124)

This invention relates to an improved process for the manufacture of unsaturated organic compounds such as methacrylamide and similar compounds and their derivatives.

In British Patent No. 405,699 there is described a process for the production of esters of methacrylic acid in which one step comprises treating acetone cyanohydrin with concentrated or fuming sulphuric acid at a raised temperature. In copending U. S. application S. N. 48,448, there is also described the manufacture of unsaturated amides from ketone cyanohydrins other than acetone cyanohydrin by heating the cyanohydrin with sulphuric acid, oleum or an alkyl sulphuric acid and subsequently heating the mixture. In each case the heating is conducted at a temperature of about 140° C. for at least an hour, and to carry out such an operation in large scale manufacture, almost necessarily involves the batch heating of the acetone cyanohydrin-acid mixture.

It is an object of the present invention to eliminate this unsatisfactory feature of such process by providing for the conversion of the cyanohydrin in a much shorter time and thereby rendering the whole process more adaptable to continuous large scale manufacture.

According to the present invention, therefore, unsaturated amides are produced by heating a mixture of a ketone cyanohydrin and sulphuric acid, oleum, alkyl sulphuric acid or mixtures thereof, to a temperature within the range 140° C. to 180° C. for a period of time not exceeding about ten minutes. Preferably, the reaction mixture is flowed continuously through a reaction zone maintained at the required temperature, at such a rate that the time of transit does not exceed five minutes. The reacting liquid may then be worked up by known methods for the isolation of the unsaturated amide, or for conversion to the corresponding acid or ester.

In a preferred form of our invention the mixing of the cyanohydrin and the acid is also carried out in a continuous manner, the mixed reagents being then delivered directly to the heated zone where reaction is effected.

Suitable cyanohydrin mixtures are those obtained by mixing the sulphuric or other acid in the presence or absence of an inert diluent, with a cyanohydrin obtained by reacting hydrocyanic acid with a ketone of the type $R_1-CO-CHR_2R_3$ where $R_1$ is an organic radicle, $R_2$ is an organic radicle, hydrogen, or a halogen, and $R_3$ an organic radicle hydrogen or a halogen. Carbocyclic compounds containing the group $-CO-CH=$ may also be chosen as the initial ketones and an inert diluent may be added to the cyanohydrin also, if desired, prior to admixture of the latter with the acid. Antipolymerization catalysts, e. g. copper, sulphur, hydroquinone may also be added to the reaction mixture.

The proportion of cyanohydrin to acid in the reaction mixture is not a critical quantity, and amounts of acid between 1 mol. and 2 mols for every mol. of cyanohydrin all give satisfactory yields of the unsaturated amide, though we prefer to use between 1 and 1.5 mols. With much less than 1.5 mols of acid, frothing is liable to occur upon mixing which may interfere with the steady operation of the process when this step is carried out in a continuous manner according to the preferred form of the invention, and therefore in such cases we find it convenient to use not substantially less than 1.5 mols of acid per mol. of cyanohydrin.

The mixing of the reactants is preferably conducted at an elevated temperature, e. g. about 80° C., and for this reason is best performed in a vessel furnished with means for controlling the temperature. Upon mixing the acid and the cyanohydrin reaction occurs with evolution of heat, and therefore in the absence of large amounts of diluent, the temperature control means will comprise a water jacket or other cooling device. The vessel may also be provided with a stirrer to facilitate thorough mixing.

The time of heating, or in a continuous operation, the rate of flow of the liquid which gives the best yields will to some extent depend on the particular composition of the reaction mixture, and it will also be a function of the temperature to which it is subjected, but we have found that satisfactory results are obtained if the rate of flow is such that the time of transit through the hot region is between ¼ minute and 5 minutes.

One method of performing the invention consists in passing cyanohydrin-acid mixture through a coil submerged in a heated oil bath, or otherwise heated to the required temperature; in another method a film of the mixture is allowed to flow over a suitably heated metal drum. Various other equivalent methods will be apparent to those skilled in the art.

A suitable method of carrying out the preferred form of our invention in which mixing of acid and cyanohydrin is also effected continuously is to introduce the acid and the cyanohydrin into the base of a vessel fitted with a stirrer and water jacket, and to provide an overflow through which the mixed liquid is delivered via conduits to the heating zone; the reactants are thus delivered into a body of preformed mixture, and local or temporary overheating due to the heat evolved on mixing is avoided. In such a method the proportions of the two reactants can be controlled by having flow-meters in the delivery pipes.

As a result of the heat evolved during mixing some amide may be formed, but no complete or nearly complete conversion is attained until after the main heating step. It is desirable to minimize this preformation of amide since at this stage temperature control is more difficult, and too high a temperature may cause decomposition of the amide so formed.

The following examples illustrate specific methods of carrying out the invention, which is not, however, limited thereto.

Example I

95% technical acetone cyanohydrin and sulphuric acid containing 0.2% free $SO_3$ were mixed in the ratio of one molar proportion of the crude cyanohydrin to one and a half mole proportions of sulphuric acid, at a temperature between 85° and 100° C., and the mixture was allowed to flow through a coil of length 231 cms. and of cross-sectional area 0.11 square cms., immersed in an oil bath maintained at 150° C. The rate of flow was adjusted so that the time of transit was 130 seconds. Under these conditions the acetone cyanohydrin was converted to methacrylamide to the extent of 98.3%, as ascertained by analysis of the product.

Example II

Methyl ethyl ketone cyanohydrin and sulphuric acid were mixed at 85° C. in the proportion of one mol. of cyanohydrin and one and half mols of sulphuric acid, and the mixture passed through the coil described in Example I, the temperature of the heating bath being adjusted to 160° C., and the time of transit 187 seconds. Under these conditions a yield of 86.1% α-methyl crotonamide was obtained.

Example III

The product of reaction of acetone cyanohydrin and sulphuric acid, prepared as described in Example I, except that the temperature of mixing was 80–85° C., was passed through a similar tube heated by an oil bath maintained at 160° C., the time of transit being 59 seconds. A conversion of acetone cyanohydrin to methacrylamide of 92.6% was obtained.

Example IV

A mixture made by adding 1 mol. of 92% cyclohexanone cyanohydrin to 1½ mols of 100% sulphuric acid at 80–90° C. was passed through the coil described in Example I maintained at 170° C., the rate of flow being such that the time of transit was 89 secs. Analysis of the product showed a yield of 77% of cyclohexene-1-carboxyamide. On increasing the time of transit to 102 secs. the yield became 79.5%, but with longer times the yield gradually became smaller.

Example V

95% acetone cyanohydrin and 100% sulphuric acid were introduced continuously into a water jacketted vessel maintained at 80–85° C. and the mixed reactants allowed to overflow into a conduit delivering the mixture to the coil described in Example I. The rate of flow through the coil could be varied by altering the height of the mixing vessel above the coil, and suitably adjusting the feed rates of the reactants.

The following results were obtained under the conditions given below:—

| Temp. of coil | Rate of feed of sulphuric acid grs. mols/hour | Rate of feed of acetone cyanohydrin grs. mols/hr. | Time in coil (secs) | Percent yield on cyanohydrin of methacrylamide |
|---|---|---|---|---|
| °C. | | | | |
| 140 | 3.1 | 1.9 | 177 | 87.1 |
| | 5.6 | 3.6 | 97 | 89.7 |
| | 4.2 | 2.7 | 130 | 98.4 |
| 150 | 3.55 | 2.3 | 153 | 97.7 |
| | 1.95 | 1.25 | 279 | 86.4 |
| | 14.3 | 9.2 | 38 | 94.4 |
| 160 | 5.4 | 3.45 | 101 | 95.1 |
| | 2.7 | 1.74 | 202 | 91.2 |
| | 20.9 | 13.5 | 26 | 89.4 |
| 170 | 12.4 | 7.9 | 44 | 91.2 |
| | 6.1 | 3.9 | 89 | 86.8 |
| | 34 | 22 | 16 | 94.5 |
| 180 | 15.1 | 9.7 | 36 | 91.6 |
| | 9.5 | 6.1 | 57 | 85.7 |

We claim:

1. Process for the manufacture of unsaturated amides from ketone cyanohydrins which comprises heating a mixture of the ketone cyanohydrin with an acid chosen from the group consisting of sulphuric acid, oleum, alkyl sulphuric acid and mixtures thereof, to a temperature of 140°–180° C. for a period of time not substantially greater than 10 minutes.

2. Process according to claim 1 in which the operation is carried out in a continuous manner by passing the acid-cyanohydrin mixture continuously through a heated reaction zone.

3. Process according to claim 1 in which the acid-cyanohydrin mixture contains between 1 and 2 mols of acid for every mol. of cyanohydrin.

4. Process for the manufacture of methacrylamide from acetone cyanohydrin which comprises heating a mixture of acetone cyanohydrin with an acid chosen from the group consisting of sulphuric acid, oleum, alkyl sulphuric acid and mixtures thereof, to a temperature of 140°–180° C. for a period of time not substantially greater than 10 minutes.

5. Process according to claim 4 in which the operation is carried out in a continuous manner by passing the acid-cyanohydrin mixture continuously through a heated reaction zone.

6. Process for the manufacture of unsaturated amides from ketone cyanohydrins in a continuous manner which consists in continuously introducing the ketone cyanohydrin and an acid chosen from the group consisting of sulphuric acid, oleum, alkyl sulphuric acid and mixtures thereof into a mixing vessel from which the mixture is continuously fed to a heated reaction zone at 140°–180° C. at such a rate that the reaction time does not substantially exceed 10 minutes.

7. Process according to claim 6 in which the time of passage of the acid-cyanohydrin mixture through the heated reaction zone is between ¼ minute and 5 minutes.

8. Process for the manufacture of methacrylamide from acetone cyanohydrin in a continuous manner which consists in continuously introducing the acetone cyanohydrin and an acid chosen from the group consisting of sulphuric acid, oleum, alkyl sulphuric acid and mixtures thereof into a mixing vessel from which the mixture is continuously fed to a heated reaction zone at 140°–180° C. at such a rate that the reaction time does not substantially exceed 10 minutes.

9. Process according to claim 8 in which the time of passage of the acid-cyanohydrin mixture through the heated reaction zone is between ¼ minute and 5 minutes.

10. Process according to claim 6 in which the ketone cyanohydrin is methyl ethyl ketone cyanohydrin.

11. Process according to claim 6 in which the ketone cyanohydrin is cyclohexanone cyanohydrin.

12. Process for the manufacture of unsaturated amides from ketone cyanohydrins which comprises heating a mixture of the ketone cyanohydrin with concentrated sulphuric acid, to a temperature between 140° and 180° C., for a period of time not substantially greater than 10 minutes.

13. Process for the manufacture of methacrylamide from acetone cyanohydrin which comprises heating a mixture of approximately 95% technical acetone cyanohydrin and sulphuric acid containing approximately 0.2% free $SO_3$ in the ratio of approximately 1 molar proportion of the crude cyanohydrin to 1½ molar proportions of sulphuric acid, to a temperature between approximately 85° and 100° C., for a period of time not substantially greater than 10 minutes.

JOHN WILLIAM CROOM CRAWFORD.
JAMES GRIGOR.